(No Model.)
W. S. ATWOOD.
PICTURE HANGER.
No. 310,114. Patented Dec. 30, 1884.
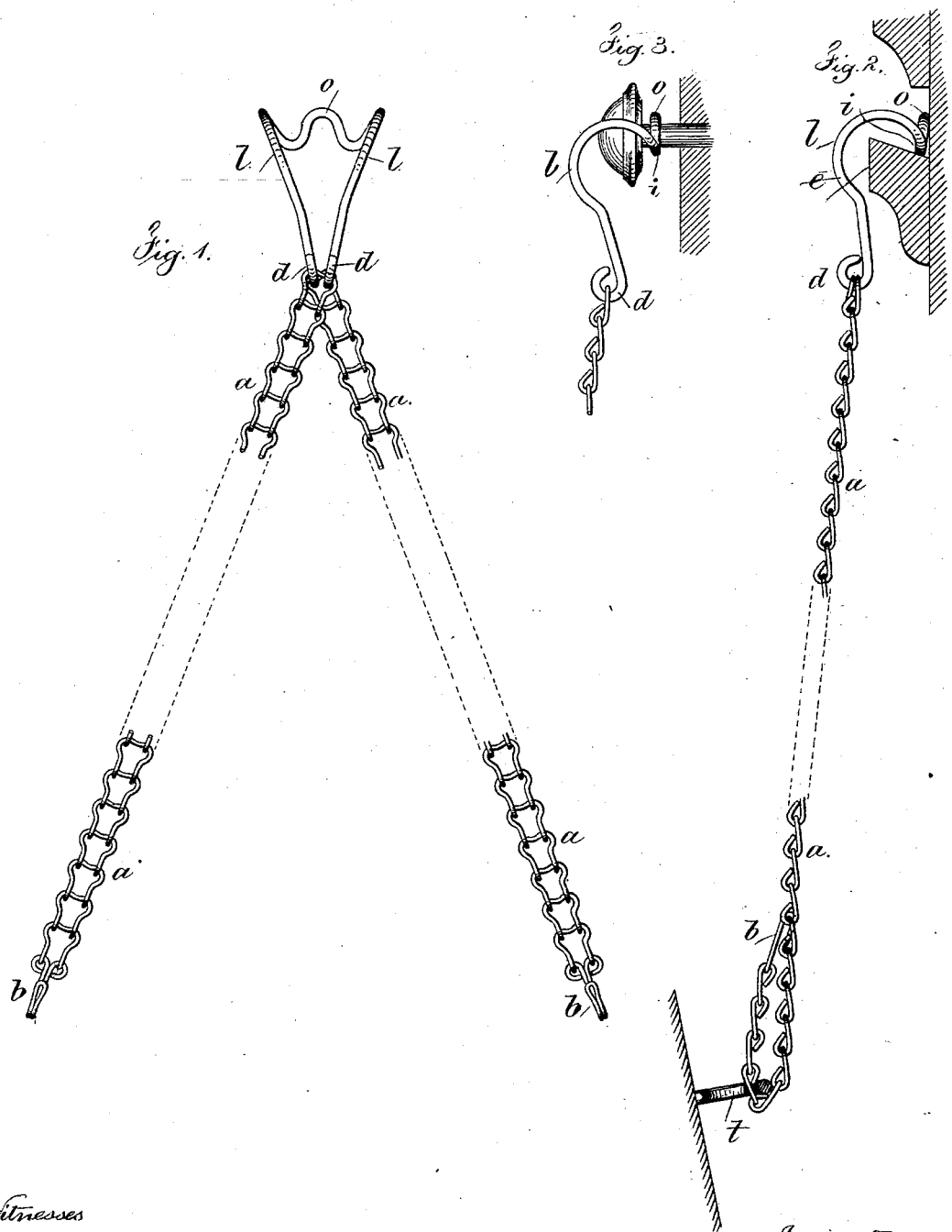
Witnesses
Chas. H. Smith
J. Starr
Inventor
Walter S. Atwood
per Lemuel W. Serrell
atty

UNITED STATES PATENT OFFICE.

WALTER S. ATWOOD, OF WATERBURY, CONNECTICUT, ASSIGNOR TO THE PLUME & ATWOOD MANUFACTURING COMPANY, OF SAME PLACE.

PICTURE-HANGER.

SPECIFICATION forming part of Letters Patent No. 310,114, dated December 30, 1884.

Application filed April 4, 1884. (No model.)

*To all whom it may concern:*

Be it known that I, WALTER S. ATWOOD, of Waterbury, in the county of New Haven and State of Connecticut, have invented an Improvement in Picture-Hangers, of which the following is a specification.

Picture-cord has been extensively used for hanging objects of art; but as the same is liable to become weak and to break by age and the action of moths its place has been filled with wire cord; but the same is not ornamental. Chains have been proposed; but heretofore no convenient means have been devised for connecting the chains to the pictures, or for hanging the picture by a nail or from the strip of molding frequently provided upon the wall near the cornice.

My invention relates to a wire hanger that is adapted to be connected with the chain and hooked over the molding, nail, or screw by which the chain and picture are suspended. I also am able to lengthen or shorten the chain and to keep the same in a flat condition, where its ornamental character may be displayed to advantage.

In the drawings, Figure 1 is an elevation of the hook and chain. Fig. 2 is a side view, and Fig. 3 shows the hook as upon a picture-nail.

I prefer to employ a chain composed of open links looped together, as shown, so that the cross-bar at one end of the link receives the loops at the ends of the wire of the next link, as shown, so that the chain has the appearance of a wire ladder and is ornamental, and I am enabled to apply at the end or ends of the chain a wire hook, $b$, which is hooked over either cross-bar of the ladder-shaped chain $a$, as represented, so that the chain may be passed through the ring or eye $t$ upon the picture-frame, and the hook $b$ hooked at the proper place to insure the required length of chain for hanging the picture. The suspending-hook is made of wire, and at the lower end it is turned over to form the hooks or loops $d$ for the reception of the chain, and at the upper end the wire is bent into the form of an open hook adapted to pass above and hook upon a strip of molding, $e$, that usually is nailed to the wall near to the cornice, the upper edge of which is grooved or beveled, so that the hook will not slip off. the part $i$ bearing upon or entering into the grooved upper surface of the molding. These moldings are not always used, and the picture is in such cases hung from a nail or knob; and in order to adapt this hanger to the various circumstances under which it may be used, I bend the central part of the wire hook upwardly as an arch at $o$, so that the same may be hooked over a nail or screw, and the sides $l$ of the wire hook, being somewhat distant from each other, allow the hanger to be applied to a knob or picture-nail head, thus accommodating the picture-hanger to the different circumstances under which it may be used.

I claim as my invention—

The suspending-hook for pictures, having an open upper end, with the downwardly-projecting portions $i$, the arch $o$, and the loops $d$ at the lower ends, substantially as set forth.

Signed by me this 24th day of March, A.D. 1884.

W. S. ATWOOD.

Witnesses:
R. T. LATTIN,
A. E. FOGG.